US010235647B2

(12) United States Patent
Moorkanat et al.

(10) Patent No.: US 10,235,647 B2
(45) Date of Patent: Mar. 19, 2019

(54) SUB-PROBLEM OPTIMIZATION OF SUPPLY CHAIN PLANNING PROBLEMS

(71) Applicant: JDA Software Group, Inc., Scottsdale, AZ (US)

(72) Inventors: Jayan Moorkanat, Marathahalli (IN); Anindya Banerjee, Cambridge, MA (US); Jayakumar Nandakumar, Vimanapura (IN)

(73) Assignee: JDA Software Group, Inc., Scottsdale, AZ (US)

( * ) Notice: Subject to any disclaimer, the term of this patent is extended or adjusted under 35 U.S.C. 154(b) by 526 days.

(21) Appl. No.: 14/966,947

(22) Filed: Dec. 11, 2015

(65) Prior Publication Data
US 2016/0098660 A1 Apr. 7, 2016

Related U.S. Application Data

(63) Continuation of application No. 12/021,088, filed on Jan. 28, 2008, now Pat. No. 9,224,110.

(60) Provisional application No. 60/893,769, filed on Mar. 8, 2007.

(51) Int. Cl.
*G06Q 10/06* (2012.01)
*G06Q 10/04* (2012.01)
(52) U.S. Cl.
CPC ....... *G06Q 10/06315* (2013.01); *G06Q 10/04* (2013.01); *G06Q 10/06* (2013.01)

(58) Field of Classification Search
CPC .................................................. G06Q 10/06
See application file for complete search history.

(56) References Cited

U.S. PATENT DOCUMENTS

| 6,701,201 B2 | 3/2004 | Hegde et al. |
| 6,947,951 B1 | 9/2005 | Gill |
| 7,197,469 B2 | 3/2007 | Hegde et al. |
| 7,499,766 B2 | 3/2009 | Knight et al. |
| 8,090,607 B2 | 1/2012 | Kasper et al. |
| 2005/0171826 A1 | 8/2005 | Denton et al. |

FOREIGN PATENT DOCUMENTS

| GB | 2447358 | 9/2008 |
| TW | 200513927 | 4/2005 |
| TW | 200634585 | 10/2006 |
| WO | WO 01/38976 | 5/2001 |

OTHER PUBLICATIONS

Search Report for Taiwan Invention Patent Application No. 097108172, dated Oct. 21, 2013.

*Primary Examiner* — A. Hunter Wilder
(74) *Attorney, Agent, or Firm* — Spencer Fane LLP; Steven J. Laureanti

(57) ABSTRACT

A system and method is disclosed for optimizing supply chain planning problems associated with a supply chain network. The system includes a supply chain planner coupled with one or more supply chain entities. The supply chain planner determines a supply chain plan for managing the flow of one or more items through the supply chain network.

20 Claims, 3 Drawing Sheets

SUB-PROBLEM OPTIMIZATION OF SUPPLY CHAIN PLANNING PROBLEMS

CROSS-REFERENCE TO RELATED APPLICATIONS

This application is a continuation of U.S. patent application Ser. No. 12/021,088, filed on Jan. 28, 2008, entitled "Sub-Problem Optimization of Supply Chain Planning Problems," which claims the benefit under 35 U.S.C. § 119(e) to U.S. Provisional Application No. 60/893,769, filed Mar. 8, 2007, and entitled "iPathFinder." U.S. patent application Ser. No. 12/021,088 and U.S. Provisional Application No. 60/893,769 are assigned to the assignee of the present application. The subject matter disclosed in U.S. patent application Ser. No. 12/021,088 and U.S. Provisional Application No. 60/893,769 is hereby incorporated by reference into the present disclosure as if fully set forth herein.

TECHNICAL FIELD

The present invention relates generally to supply chain planning and, more specifically, to sub-problem optimization of supply chain planning problems.

BACKGROUND

A supply chain plan describes items to be procured and operations to be performed by entities within a supply chain network in order to deliver materials or products to an entity, such as, for example, a customer within the supply chain network. Various constraints may be placed on the supply chain network, such as, for example, limitations on the availability of materials or products from one of the entities within the supply chain network. However, due to these various constraints, one or more of these entities within the supply chain network may not be able to satisfy all of the supply chain demand. The inability to satisfy all of the supply chain demand within the supply chain network is undesirable.

In an effort to satisfy supply chain demand, prior art entities within the supply chain network have tried to optimize this supply chain planning problem, also referred to as a supply chain planning problem, associated with these various constraints. However, this optimization has proved disadvantageous since, for example, the planning problem size and complexity on the datasets associated with each of the entities within the supply chain network is quite large. Consequently, as the size of a planning problem grows, the computational power and time required to solve the supply chain planning problem also increases. This increase in computational power and time required to solve the supply chain planning problem is undesirable

SUMMARY

A system for optimizing supply chain planning problems associated with a supply chain network is disclosed. The system includes a supply chain planner coupled with one or more supply chain entities. The supply chain planner determines a supply chain plan for managing the flow of one or more items through the supply chain network.

A method for optimizing supply chain planning problems associated with a supply chain network is also disclosed. The method provides for accessing data describing the flow of one or more items through the supply chain network and accessing constraints associated with one or more supply chain entities. The method further provides for modeling a supply chain planning problem for the one or more supply chain entities based on at least a portion of the accessed data and constraints. The method still further provides for splitting the supply chain planning problem into a master-planning problem and a sub-problem and further decomposing the sub-problem into independent sub-problems. The method yet further provides for solving the master-problem and each of the independent sub-problems of the supply chain planning problem independently and generating a supply chain plan by converging the solved master-problem and each of the solved independent sub-problems into the supply chain plan.

Software for optimizing supply chain planning problems associated with a supply chain network is also disclosed. The software is embodied in at least one computer-readable medium and, when executed on a computer system comprising one or more processing units and one or more memory units, is operable to access data describing the flow of one or more items through the supply chain network and access constraints associated with one or more supply chain entities. The software is further operable to model a supply chain planning problem for the one or more supply chain entities based on at least a portion of the accessed data and constraints. The software is still further operable to split the supply chain planning problem into a master-planning problem and a sub-problem and further decompose the sub-problem into independent sub-problems. The software is yet further operable to solve the master-problem and each of the independent sub-problems of the supply chain planning problem independently and generate a supply chain plan by converging the solved master-problem and each of the solved independent sub-problems into the supply chain plan.

BRIEF DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION

Reference will now be made to the following detailed description of the preferred and alternate embodiments of the present invention. Those skilled in the art will recognize that the present invention provides many inventive concepts and novel features, that are merely illustrative, and are not to be construed as restrictive. Accordingly, the specific embodiments discussed herein are given by way of example and do not limit the scope of the present invention.

Figure 1:
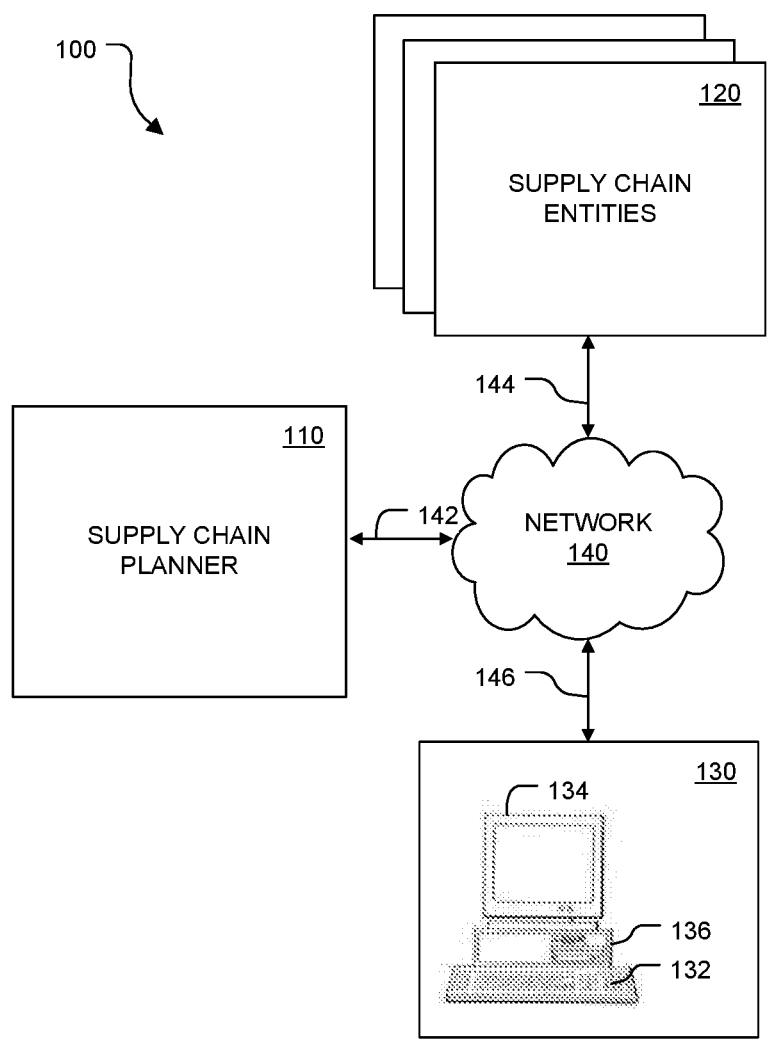
FIG. 1 illustrates an exemplary supply chain network according to a preferred embodiment.

FIG. 1 illustrates an exemplary supply chain network 100 according to a preferred embodiment of the present invention. Supply chain network 100 comprises supply chain planner 110, one or more supply chain entities 120, computers 130, a network 140, and communication links 142, 144, and 146. Although a single supply chain planner 110, one or more supply chain entities 120, a single computer 130, and a single network 140, are shown and described; embodiments contemplate any number of supply chain planners 110, any number of supply chain entities 120, any number of computers 130, or any number of networks 140, according to particular needs.

In a preferred embodiment, supply chain network 100 may describe the flow of items, such as, for example, materials and products through one or more supply chain entities 120 or other supply chain planning environments associated with supply chain network 100. As described below, supply chain network 100 may be used to determine an optimized supply chain plan that manages items to be procured and operations to be performed in order to deliver material or products to one or more supply chain entities 120, in, for example, a particular planning horizon.

In one embodiment, supply chain network 100 may consider various constraints associated with one or more supply chain entities 120 when determining an optimized supply chain plan, such as, for example, limitations on the availability of materials from one or more supply chain entities 120, the capacity of one or more supply chain entities 120, and the like. As described below in more detail, these various constraints may prevent one or more supply chain entities 120 from satisfying supply chain demand, and may delay supply chain demand from being satisfied during a particular planning horizon. In addition, or as an alternative, the optimized supply chain plan may evaluate and select various optimal solutions based on the objectives of one or more supply chain entities 120. These objectives may include, but are not limited to, maximizing demand satisfaction, minimizing inventory, and maximizing use of preferred alternatives.

In addition, these various optimal solutions are associated with a supply chain planning problem of supply chain network 100, and may include an optimized supply chain plan represented by a set of operations to be performed across a particular planning horizon. Although, supply chain network 100 is shown and described as associated with one or more supply chain entities 120, supply chain network 100 may provide an optimized supply chain plan to any number of supply chain entities, according to particular needs.

Supply chain network 100 may operate on one or more computers 130 that are integral to or separate from the hardware and/or software that support supply chain planner 110 and one or more supply chain entities 120. Computers 130 may include any suitable input device 132, such as a keypad, mouse, touch screen, microphone, or other device to input information. An output device 134 may convey information associated with the operation of supply chain network 100, including digital or analog data, visual information, or audio information. Computers 130 may include fixed or removable storage media, such as magnetic computer disks, CD-ROM, or other suitable media to receive output from and provide input to supply chain network 100. Computers 130 may include one or more processors 136 and associated memory to execute instructions and manipulate information according to the operation of supply chain network 100.

Although a single computer 130 is shown in FIG. 1, supply chain planner 110 and one or more supply chain entities 120 may each operate on separate computers 130 or may operate on one or more shared computers 130. Each of the one or more computers 130 may be a work station, personal computer (PC), network computer, notebook computer, personal digital assistant (PDA), cell phone, telephone, wireless data port, or any other suitable computing device.

In one embodiment, supply chain planner 110 is coupled to network 140 using communications link 142, which may be any wireline, wireless, or other link suitable to support data communications between supply chain planner 110 and network 140 during operation of supply chain network 100. One or more supply chain entities 120 are coupled to network 140 using communications link 144, which may be any wireline, wireless, or other link suitable to support data communications between one or more supply chain entities 120 and network 140 during operation of supply chain network 100. Computers 130 are coupled to network 140 using communications link 146, which may be any wireline, wireless, or other link suitable to support data communications between computers 130 and network 140 during operation of supply chain network 100.

Although communication links 142, 144, and 146 are shown as generally coupling supply chain planner 110, one or more supply chain entities 120, and computers 130 to network 140, supply chain planner 110, one or more supply chain entities 120, and computers 130 may communicate directly with supply chain planner 110, one or more supply chain entities 120, and computers 130, according to particular needs.

In another embodiment, network 140 includes the Internet and any appropriate local area networks (LANs), metropolitan area networks (MANS), or wide area networks (WANs) coupling supply chain planner 110, one or more supply chain entities 120, and computers 130. For example, data may be maintained by supply chain planner 110 at one or more locations external to supply chain planner 110 and one or more supply chain entities 120 and made available to one or more associated users of one or more supply chain entities 120 using network 140 or in any other appropriate manner. Those skilled in the art will recognize that the complete structure and operation of communication network 140 and other components within supply chain network 100 are not depicted or described. Embodiments may be employed in conjunction with known communications networks and other components.

Figure 2:
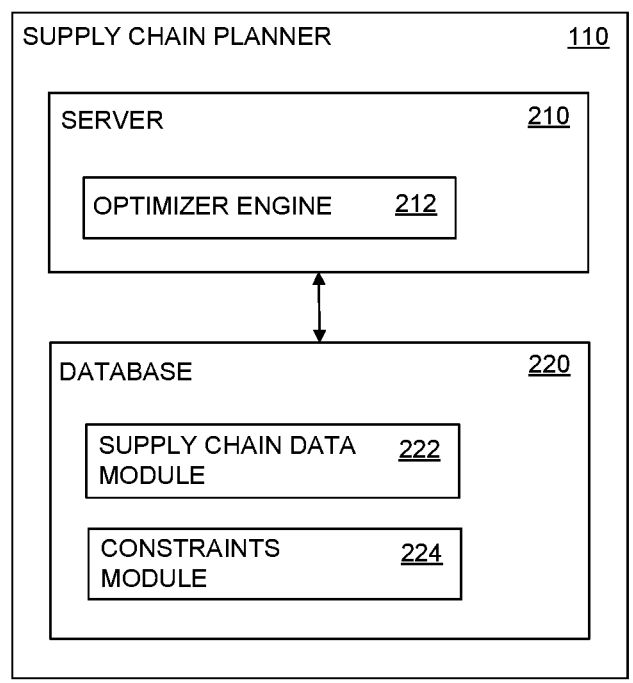
FIG. 2 illustrates the supply chain planner of FIG. 1 in greater detail in accordance with the preferred embodiment.

FIG. 2 illustrates supply chain planner 110 of FIG. 1 in greater detail in accordance with the preferred embodiment. Supply chain planner 110 comprises a server 210 coupled with a database 220. Supply chain planner 110, and in particular, server 210, stores supply chain data and various constraints associated with one or more supply chain entities 120, in database 220. As discussed above, supply chain planner 110 comprises one or more computers 130 at one or more locations and associated input devices, output devices, mass storage media, processors, memory, or other components for receiving, processing, storing, and communicating information according to the operation of supply chain network 100.

In addition, or as an alternative, supply chain planner 110 may operate on one or more computers 130 that are integral to or separate from one or more supply chain entities 120. For example, supply chain planner 110 may be integral to each of the one or more supply chain entities 120 or may be separate from each of the one or more supply chain entities 120.

Server 210 manages applications that generate an optimized supply chain plan for items to be procured and operations to be performed in order to deliver material or products to one or more supply chain entities 120 of supply chain network 100. As discussed in more detail below, server 210 comprises an optimizer engine 212 for generating an optimized supply chain plan of a supply chain planning problem associated with supply chain network 100.

As an example only and not by way of limitation, optimizer engine 212 may use a linear programming technique to solve various constraints associated with, or applied to, one or more supply chain entities 120. Although server 210 is shown and described as comprising optimizer engine 212, embodiments contemplate any suitable engine or combination of engines, according to particular needs.

Database 220 comprises one or more databases or other data storage arrangements at one or more locations, local to, or remote from, server 210. Database 220 may include, for example, supply chain data module 222 and constraints module 224. Database 220 stores supply chain data associated with one or more supply chain entities 120 into supply chain data module 222 that may be used by server 210. Supply chain data 222 may be, for example, data that describes the flow of items such as materials and/or products through one or more supply chain entities 120.

Constraints stored in constraints module 224 may be constraints that are associated with, or applied to, one or more supply chain entities 120, and may prevent one or more supply chain entities 120 from satisfying supply chain demand, in, for example, a particular planning horizon. Constraints stored in constraints module 224 may include, but are not limited to, lead time constraints that describe the time required for one or more supply chain entities 120 to supply items to one or more other supply chain entities 120, lot size constraints that define a quantity of items that may be transferred to, or from, one or more supply chain entities 120, and/or capacity constraints that describe a maximum quantity of items that may be produced, or stored, at one or more supply chain entities 120. Although, constraints have been described as particular constraints, embodiments contemplate any constraint or combination of constraints associated with, or applied to, one or more supply chain entities 120.

To further explain the operation of supply chain planner 110, an example is now given. In the following example, server 210 models a supply chain planning problem associated with one or more supply chain entities 120. That is, optimizer engine 212 represents one or more supply chain entities 120 related to the supply chain planning problem, in terms of software entities. In addition, or as an alternative, server 210 models the constraints associated with one or more supply chain entities 120, wherein the constraints are modeled to represent the flow of items through supply chain network 100. In addition, supply chain network 100 including the constraints associated with one or more supply chain entities 120 are valid for a particular period of interest, i.e., a planning horizon.

In one embodiment, server 210 models the supply chain planning problem as hierarchical linear programming objectives, wherein each level of the hierarchy is associated with an objective function and the objective function is modeled as a business goal for one or more supply chain entities 120. Optimizer engine 212 solves each level of the hierarchy, such that, the objective function of a prior level of the hierarchy is not degraded by a subsequent one. In addition, or as an alternative, optimizer engine 212 may solve each level of the hierarchy in parallel, that is, optimizer engine 212 may utilize one or more processors 136 and associated memory to converge each optimized level of the hierarchy into an optimized supply chain plan.

Thus in accordance with the principles of embodiments, supply chain planner 110 solves each level of the hierarchy in parallel. Among other things, this reduces the complexity of the supply chain planning problem and minimizes the number of iterations required to solve the supply chain planning problem, which enables embodiments to reduce the time required to solve the supply chain planning problem.

Figure 3:
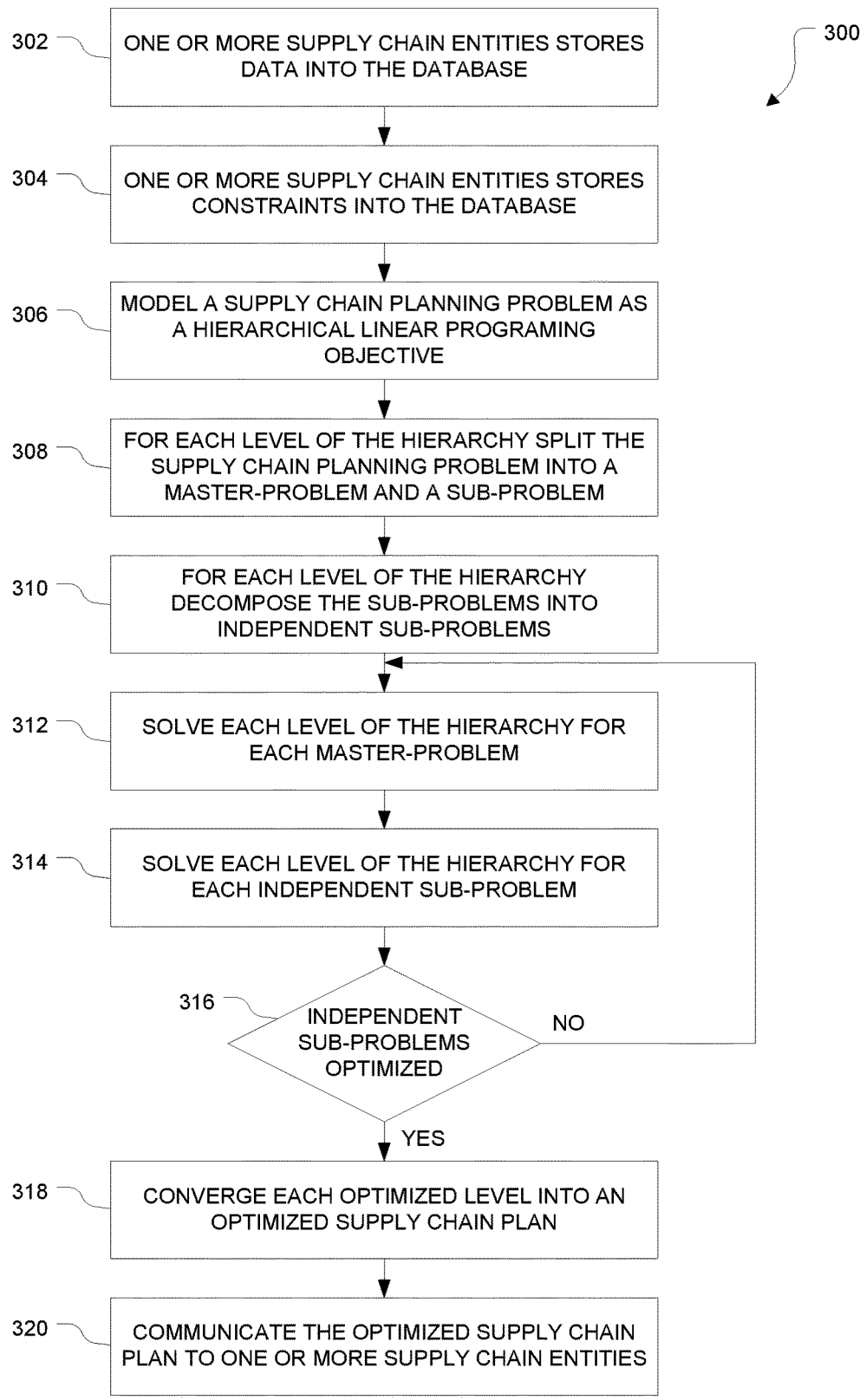
FIG. 3 illustrates an exemplary method for optimizing supply chain planning problems associated with a supply chain network.

FIG. 3 illustrates an exemplary method for optimizing supply chain planning problems associated with supply chain network 100. As discussed above, supply chain planner 110 generates an optimized supply chain plan of a supply chain planning problem associated with supply chain network 100.

The method begins at step 302, where one or more supply chain entities 120 store data into database 220 and in particular, supply chain data module 222. As discussed above, data stored into supply chain data module 222 describes the flow of items such as materials and/or products through supply chain network 100. At step 304, one or more supply chain entities 120 store constraints associated with, or applied to, one or more supply chain entities 120 into database 220 and in particular, constraints module 224.

At step 306, server 210 accesses supply chain data module 222 and constraints module 224. Server 210 models a supply chain planning problem for one or more supply chain entities 120 as a hierarchical linear programming objective based on at least a portion of accessed supply chain data and constraints. As discussed above, each level of the hierarchy is associated with an objective function and the objective function is modeled as a business goal for one or more supply chain entities 120.

At step 308, for each level of the hierarchy, server 210 splits the supply chain planning problem into a master-problem and a sub-problem. For example, server 210 provides for iteratively optimizing the supply chain planning problem by splitting the supply chain planning problem into a master-problem and a sub-problem. In addition, each master-problem and each sub-problem comprises constraints, which, as discussed above, may be associated with, or applied to, one or more supply chain entities 120. At step 310, for each level of the hierarchy, server 210 decomposes each sub-problem into independent sub-problems.

At step 312, optimizer engine 212 solves each level of the hierarchy for each master-problem. As an example only and not by way of limitation, optimizer engine 212 may use a column generation technique to solve each level of the hierarchy for each master-problem by interacting with each independent sub-problem. In this manner, optimizer engine 212 generates columns using the solution of the master-problem. Although, a column generation technique is described for solving master-problems, embodiments contemplate any suitable technique or combination of techniques, according to particular needs.

At step 314, optimizer engine 212 solves each level of the hierarchy for each independent sub-problem in parallel, such that, the objective function of a prior level of the hierarchy is not degraded by a subsequent one. In addition, optimizer engine 212 may utilize one or more processors 136 and associated memory to independently solve each level of the hierarchy for each independent sub-problem. As an example only and not by way of limitation, optimizer engine 212 may use a shortest path and/or minimum cost flow technique to solve each level of the hierarchy for each independent sub-problem. In this manner, optimizer engine 212 models the solution of the independent sub-problem as, for example, a shortest path problem and/or a minimum cost flow generated by relaxing certain constraints associated with one or more supply chain entities 120. Although, a shortest path technique is described for solving independent sub-problems, embodiments contemplate any suitable technique or combination of techniques, according to particular needs.

At step 316, server 210 determines whether each level of the hierarchy for each independent sub-problem is optimized. If each level of the hierarchy for each independent sub-problem is not optimized, server 210 returns to step 312 to solve each level of the hierarchy for each master-problem and independent sub-problem, thereby performing an iterative sequential run of optimizer engine 212. If each level of the hierarchy for each independent sub-problem is optimized, the method proceeds to step 318.

At step 318, optimizer 212 generates an optimized supply chain plan by converging each optimized level of the hierarchy for each master-problem and each independent sub-problem. At step 320, the optimized supply chain plan in communicated to the one or more supply chain entities 120. The optimized supply chain plan enables one or more supply chain entities to satisfy all of the supply chain demand within supply chain network 100, in a particular planning horizon. Once the supply chain plan has been optimized and communicated to one or more supply chain entities 120, the method ends.

Reference in the foregoing specification to "one embodiment", "an embodiment", or "another embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments of the present invention have been shown and described, it will be understood that various changes and modifications to the foregoing embodiments may become apparent to those skilled in the art without departing from the spirit and scope of the present invention. Accordingly, the invention is not limited to the embodiments disclosed, but rather by the appended claims and their equivalents.

What is claimed is:

1. A supply chain planning system comprising:
one or more computers coupled with one or more databases that stores one or more constraints associated with one or more supply chain entities and data describing a flow of one or more items through a supply chain network, the supply chain network comprising the one or more supply chain entities that produce the one or more items, the one or more computers configured to:
model a supply chain planning problem as a hierarchy of linear programming objectives, wherein each level of the hierarchy is associated with an objective function;
split the supply chain planning problem into a master-problem and a sub-problem and decompose the sub-problem into independent sub-problems;
solve iteratively the master-problem and the independent sub-problems, wherein each of the independent sub-problems of the supply chain planning problem are solved in parallel by two or more processors; and
generate a supply chain plan by converging each level of the hierarchy for the master-problem and the independent sub-problems into the supply chain plan.

2. The system of claim 1, wherein the one or more computers are further configured to:
model the one or more constraints for a flow through the supply chain network, based on a planning horizon; and
model the supply chain planning problem for the one or more supply chain entities based on at least a portion of the data that describes the flow of the one or more items through the supply chain network and the one or more constraints.

3. The system of claim 1, wherein the one or more constraints comprise lead time constraints that describe a time required for at least one of the one or more supply chain entities to supply the one or more items to another of the one or more other supply chain entities.

4. The system of claim 1, wherein the one or more constraints comprise lot size constraints that define a quantity of the one or more items that may be transferred.

5. The system of claim 1, wherein the one or more constraints comprise capacity constraints that describe a maximum quantity of the one or more items that may be produced at the one or more supply chain entities.

6. The system of claim 1, wherein the one or more constraints comprise capacity constraints that describe a maximum quantity of the one or more items that may be stored at the one or more supply chain entities.

7. The system of claim 1, wherein the one or more computers are further configured to:
model the supply chain planning problem as a hierarchical linear programming objective based on at least a portion of the accessed data and constraints.

8. A computer-implemented method, comprising:
accessing one or more constraints associated with one or more supply chain entities and data describing a flow of one or more items through a supply chain network comprising the one or more supply chain entities that produce the one or more items;
modeling a supply chain planning problem as a hierarchy of linear programming objectives, wherein each level of the hierarchy is associated with an objective function;
splitting the supply chain planning problem into a master-problem and a sub-problem and decomposing the sub-problem into independent sub-problems;
solving iteratively the master-problem and the independent sub-problems, wherein each of the independent sub-problems of the supply chain planning problem are solved in parallel by two or more processors; and
generating a supply chain plan by converging each level of the hierarchy for the master-problem and the independent sub-problems into the supply chain plan.

9. The computer-implemented method of claim 8, further comprising:
modeling the one or more constraints for a flow through the supply chain network, based on a planning horizon; and
modeling the supply chain planning problem for the one or more supply chain entities based on at least a portion of the data that describes the flow of the one or more items through the supply chain network and the one or more constraints.

10. The computer-implemented method of claim 8, wherein the one or more constraints comprise lead time constraints that describe a time required for at least one of the one or more supply chain entities to supply the one or more items to another of the one or more other supply chain entities.

11. The computer-implemented method of claim 8, wherein the one or more constraints comprise lot size constraints that define a quantity of the one or more items that may be transferred.

12. The computer-implemented method of claim 8, wherein the one or more constraints comprise capacity constraints that describe a maximum quantity of the one or more items that may be produced at the one or more supply chain entities.

13. The computer-implemented method of claim 8, wherein the one or more constraints comprise capacity constraints that describe a maximum quantity of the one or more items that may be stored at the one or more supply chain entities.

14. The computer-implemented method of claim 8, further comprising:
    modeling the supply chain planning problem as a hierarchical linear programming objective based on at least a portion of the accessed data and constraints.

15. A non-transitory computer-readable medium embodied with software, the software when executed using one or more computer systems is programmed to:
    access one or more constraints associated with one or more supply chain entities and data describing a flow of one or more items through a supply chain network comprising the one or more supply chain entities that produce the one or more items;
    model a supply chain planning problem as a hierarchy of linear programming objectives, wherein each level of the hierarchy is associated with an objective function;
    split the supply chain planning problem into a master-problem and a sub-problem and decompose the sub-problem into independent sub-problems;
    solve iteratively the master-problem and the independent sub-problems, wherein each of the independent sub-problems of the supply chain planning problem are solved in parallel by two or more processors; and
    generate a supply chain plan by converging each level of the hierarchy for the master-problem and the independent sub-problems into the supply chain plan.

16. The non-transitory computer-readable medium of claim 15, wherein the software when executed using one or more computer systems is further programmed to:
    model the one or more constraints for a flow through the supply chain network, based on a planning horizon; and
    model the supply chain planning problem for the one or more supply chain entities based on at least a portion of the data that describes the flow of the one or more items through the supply chain network and the one or more constraints.

17. The non-transitory computer-readable medium of claim 15, wherein the one or more constraints comprise lead time constraints that describe a time required for at least one of the one or more supply chain entities to supply the one or more items to another of the one or more other supply chain entities.

18. The non-transitory computer-readable medium of claim 15, wherein the one or more constraints comprise lot size constraints that define a quantity of the one or more items that may be transferred.

19. The non-transitory computer-readable medium of claim 15, wherein the one or more constraints comprise capacity constraints that describe a maximum quantity of the one or more items that may be produced at the one or more supply chain entities.

20. The non-transitory computer-readable medium of claim 15, wherein the one or more constraints comprise capacity constraints that describe a maximum quantity of the one or more items that may be stored at the one or more supply chain entities.

\* \* \* \* \*